United States Patent [19]

Ueda et al.

[11] Patent Number: 5,066,897
[45] Date of Patent: Nov. 19, 1991

[54] LINEAR DRIVING APPARATUS

[75] Inventors: Tetuyuki Ueda, Nara; Masayoshi Tsunezawa, Sakai, both of Japan

[73] Assignee: Sharp Kabushiki Kaisha, Osaka, Japan

[21] Appl. No.: 652,205

[22] Filed: Feb. 5, 1991

Related U.S. Application Data

[63] Continuation of Ser. No. 7,356,173, May 24, 1989, abandoned.

[30] Foreign Application Priority Data

| May 26, 1988 | [JP] | Japan | 63-129982 |
| Aug. 30, 1988 | [JP] | Japan | 63-217276 |
| Nov. 30, 1988 | [JP] | Japan | 63-304357 |

[51] Int. Cl.$^5$ .................................. G02K 41/02
[52] U.S. Cl. ........................ 318/135; 310/12
[58] Field of Search .............. 310/12, 112; 318/135

[56] References Cited

U.S. PATENT DOCUMENTS

| 2,782,328 | 2/1957 | Lindberg | 310/112 |
| 3,376,578 | 4/1968 | Sawyer | 318/135 |
| 3,787,716 | 1/1974 | La France | 315/135 |
| 3,909,643 | 9/1975 | Kishima | 310/68 |
| 3,912,991 | 10/1975 | Moyse | 310/13 |

FOREIGN PATENT DOCUMENTS

| 2510838 | 2/1983 | France . |
| 56-87065 | 7/1981 | Japan . |
| 58-93461 | 8/1983 | Japan . |
| 60-136731 | 7/1985 | Japan . |

*Primary Examiner*—Steven L. Stephan
*Assistant Examiner*—Judson H. Jones

[57] ABSTRACT

A linear driving apparatus using two units of linear motors each having rotors being coupled to each other which are suitable to provide high accuracy for the positioning control and the speed control. The first and second linear motors, which, are coupled in shape by the coupling member are not controlled independently and the impellent force, to the first and second linear motors are equal. Thereby, construction of the apparatus is considerably simplified, and the positional contol and the speed control is highly accurate.

9 Claims, 7 Drawing Sheets

LINEAR DRIVING APPARATUS

This application is a continuation of application Ser. No. 07/356.173 filed on May 24, 1989 now abandoned.

BACKGROUND OF THE INVENTION

The present invention generally relates to a linear driving apparatus using two units of linear motors with the rotors being coupled to each other, and more particularly, to a linear driving apparatus for controlling the operation of the position and the speed at a high accuracy.

FIG. 11 is a plan view illustrating the appearance of a linear driving apparatus having been designed previously by the inventors, while FIG. 12 is an electric block diagram of the linear driving apparatus. In the previous design of FIGS. 11 and 12, there are provided two units of linear motors 10 and 20, which are three-phase brushless linear motors. By the independent speed controlling operation of the linear motors 10 and 20, the stators 11 and 22 coupled by a coupling member 30 which may move freely, with the gap being open, with respect to the stators 11, 21 are basically to be driven in a driving direction as shown in the drawing. In further detail, photo detectors 124 and 125 corresponding to linear scales 113 and 114 pasted on the sides of the stators are provided respectively on the sides of the coupled rotors 12 and 22. The signals transmitted from the photo detectors 124 and 125 as the positional information of the rotors 11 and 12 are introduced into a linear motor portion 40 which mainly includes micro-computers. The impellent force to be caused by the rotors 12 and 22 are adjusted independently by the linear motor control portion 40 so that a moving object (not shown) secured on the rotors and 22 may move at a predetermined speed. Polyphase windings 121 and 221 are secured on the reverse faces of the rotors 12 and 22, and hall elements 123 and 223 for detecting the magnetic poles of the magnetic flux to be transmitted from the stators 11 and 21 are secured thereon so as to give the timings from the polyphase excitation in the polyphase windings 121 and 221 to the linear motor control portion 40.

However, in the above-described conventional embodiment, as the linear motor 10 and the linear motor 20 are adapted to effect independent controlling operations, the linear motor controlling portion 40 is inevitably required to be made more complicated by including a considerable number of components such as photo detectors 124, hall elements 123, etc. which are required. Thereby, large obstacles are caused in lowering the cost of the apparatus. Some differences in the impellent force to be caused in the linear motors 10 and 20 may cause the moving object to be yawed. Particularly, when controlling the operations of the position and the speed at higher accuracy, some differences in the impellent force become large disturbance factors in the control system.

SUMMARY OF THE INVENTION

Accordingly, an essential object of the present invention is to provide an improved linear driving apparatus, which is capable of effecting the higher accuracy of controlling the operations together with lowering the cost of the apparatus.

In accomplishing the object, according to an embodiment of the present invention, there is provided a linear driving apparatus which includes first and second linear motors, wherein rotors each having polyphase windings are freely movable through a gap onto stators each having permanent magnets, and a coupling member for mutually coupling the rotors in the first and second linear motors so as to excite in polyphase the polyphase windings in the first and second linear motors to drive the rotors, wherein the polyphase windings of the same phase in the respective rotors of the first and second linear motors are connected with respect to each other in series or in parallel. Accordingly, the polyphase windings of the same phase in the respective rotors of the first and second linear motors are connected in series or in parallel so that the polyphase currents flowing into the respective rotors become equal with respect to each other.

Another object of the present invention is to provide a linear driving apparatus, which is capable of increasing the impellent force without any rise in power voltage. There is provided a linear driving apparatus which includes first and second linear motors, wherein rotors each having polyphase windings are freely movable through a gap onto stators each having permanent magnets, and a coupling member for mutually coupling the rotors in the first and second linear motors so as to excite in polyphase the polyphase windings in the first and second linear motors to drive the rotors, wherein the winding coils of the same phase are connected with respect to each other in series or in parallel with respect to the polyphase windings and a ring connection is provided for the winding coils as the whole. Accordingly, when the polyphase exciting currents are fed into the polyphase windings ring-connected as the whole, impellent forces of the same direction and magnitude are caused in the first and second linear motors so that both the rotors coupled by the coupling member are driven on the faces of the stators.

A further object of the present invention is to provide a linear driving apparatus which is so arranged that the magnetic attractive forces to be generated in the first and second linear motors may not affect the guide members.

In the linear driving apparatus of the present invention, which includes first and second linear motors equipped with stators each having a plurality of permanent magnets, rotors each having polyphase windings, a coupling member for mutually coupling the rotors in the first and second linear motors, a guide member for axially supporting the coupling member or the rotors, so that the polyphase windings in the first and second linear motors are excited in polyphase to drive the rotors. The stators in the first and second linear motors are disposed vertically, and the rotors are disposed on both the end portions in the longitudinal direction of the coupling member.

Accordingly, as the direction of the magnetic attractive force to be generated in the first linear motor is mutually opposite to the direction of the magnetic attractive force to be caused in the second linear motor, the magnetic attractive forces to be caused in both the linear motors are negated.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1 is a perspective view illustrating the simplified construction view of the linear driving apparatus;

FIG. 2 is a plan view of the linear driving apparatus;

FIG. 3 is a side sectional view thereof;

FIG. 4 is a simplified side view of a linear motor;

FIG. 5 is a reverse face view of a rotor;

FIG. 6 is an electrical block diagram of the linear driving apparatus;

FIG. 7 is a connection view of polyphase windings in the linear motor;

DETAILED DESCRIPTION OF THE PREFERRED EMBODIMENTS OF THE PRESENT INVENTION

Figure 1:
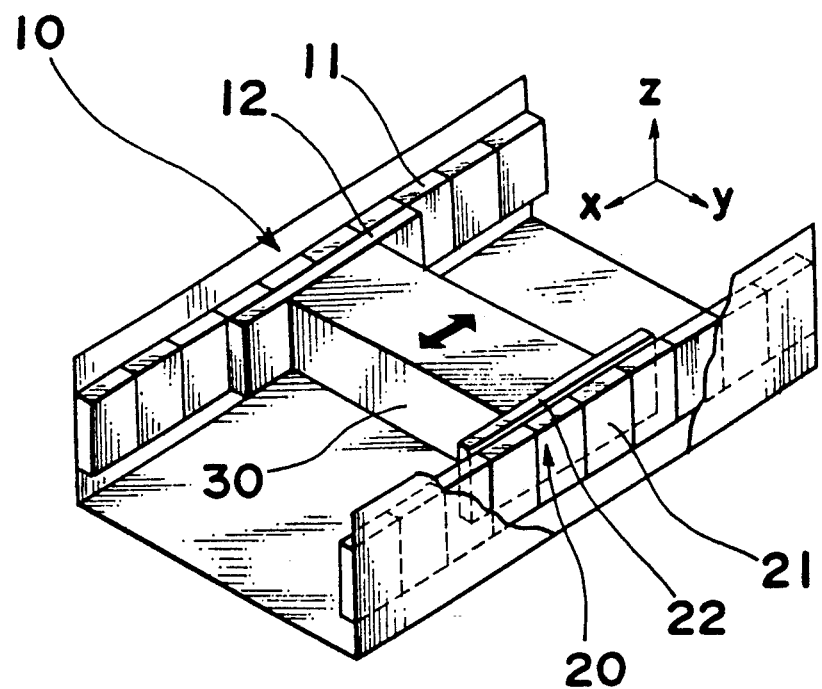
FIG. 1 through FIG. 7 illustrate a first embodiment in a linear driving apparatus in accordance with the present invention.
Figure 2:
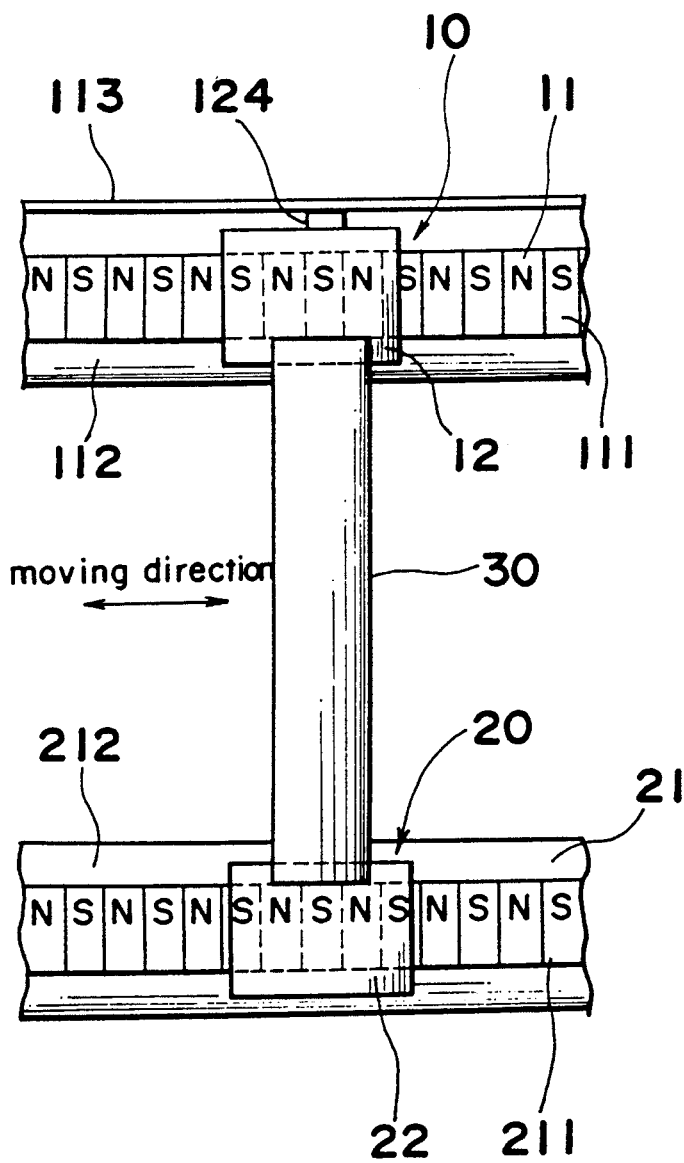
Figure 3:
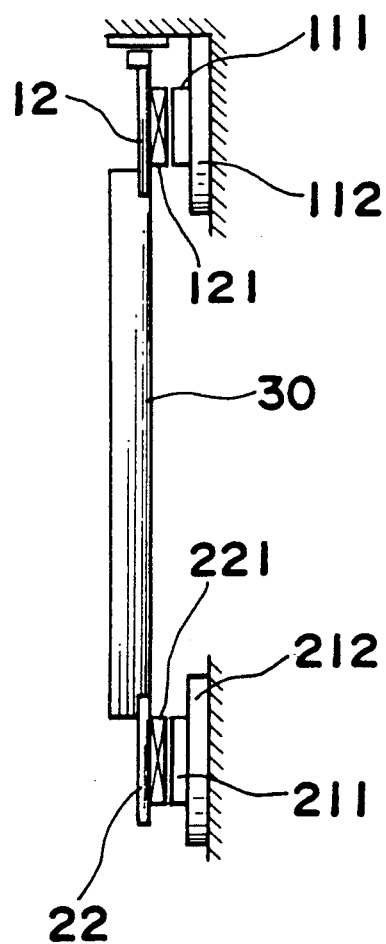

Before the description of the present invention proceeds, it is to be noted that like parts are designated by like reference numerals throughout the accompanying drawings.

Referring now to the drawings, there is illustrated in FIG. 1, a linear driving apparatus according to one preferred embodiment of the present invention, which includes two units of linear motors 10 and 20 as three-phase brushless linear motors, with the rotors 12 and 22 being coupled to each other by a rigid coupling member 30. A moving object (not shown) secured onto the top face of the coupling member 30 is adapted to be alternately moved in a direction shown in the drawing through the controlling of the impellent force caused in the linear motors 10 and 20 by a microcomputer.

Figure 4:
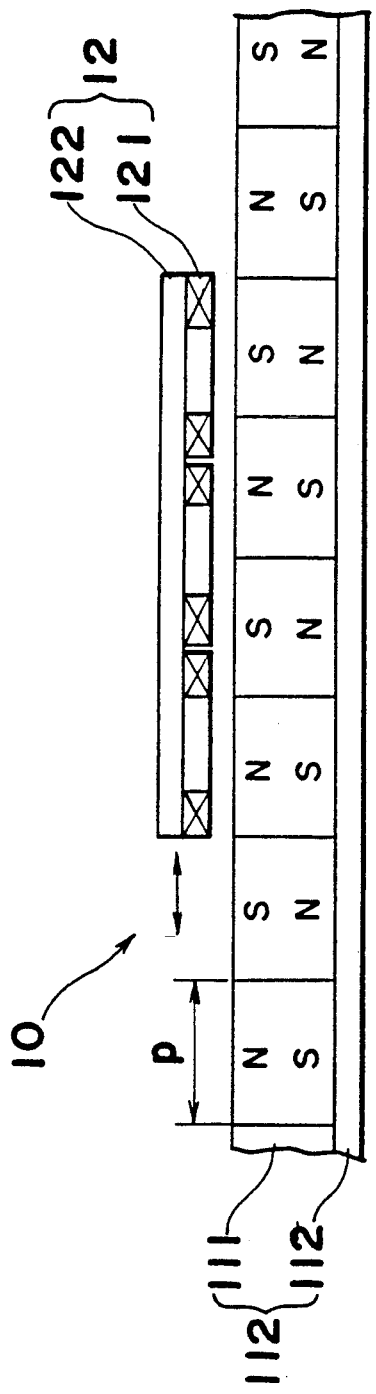
Figure 5:
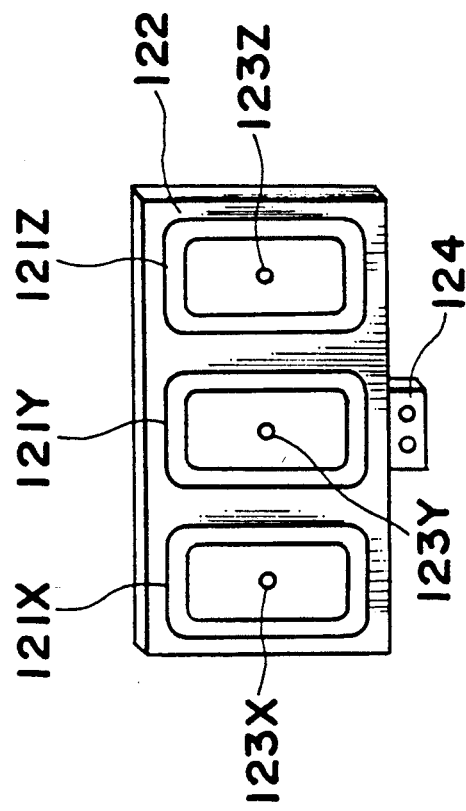

The mechanical construction of the linear driving apparatus will be described hereinafter. A linear motor 10 equivalent to a first linear motor include a stator 11 with a plurality of permanent magnets 111 being alternately magnetized on the top face of the stator heel piece 112 as illustrated in FIG. 4, and a rotor 12 with a polyphase windings 121 secured onto the under face of the rotor heel piece 122. The rotor 12 is freely movable at a given interval with respect to the magnet faces of the stator 11 by a guide not shown. The hall elements 123Y and 123Z which are magnetic detection elements for excitation change-over detection use, are secured into the respective central positions of air-core coils 121X, 121Y and 121Z provided in parallel as the polyphase windings 121 as illustrated in FIG. 5. Furthermore, a photo detector 124 of a reflection type is secured on the side face of the rotor 12. The lights transmitted from the photo detector 124 are reflected, and received by a linear scale (not shown) disposed on the side of the stator of the linear motor 10 so that the positional detection of the mutually coupled rotors 12 and 22 is adapted to be effected It is to be noted that the magnetic pole pitch p of the permanent magnet 111 in the stator 11 is established at three-fourth magnification with respect to the pitch interval of the air-core coils 121X, 121Y and 121Z in the rotor 12.

The linear motor 20 equivalent to a second linear motor is the same in construction as the above-described linear motor 10 with the exception that the linear motor 20 is not equipped with hall elements 123X, 123Y and 123Z, a photo detector, etc. The air-core coils 221X, 221Y and 221Z as the polyphase windings 221 correspond to the air-core coils 121X, 121Y and 121z as the polyphase windings 121. Although, not shown, cables, etc. are drawn out from the rotors 12 and 22 and are guided onto the linear motor control portion 40 which will be described later.

Figure 6:
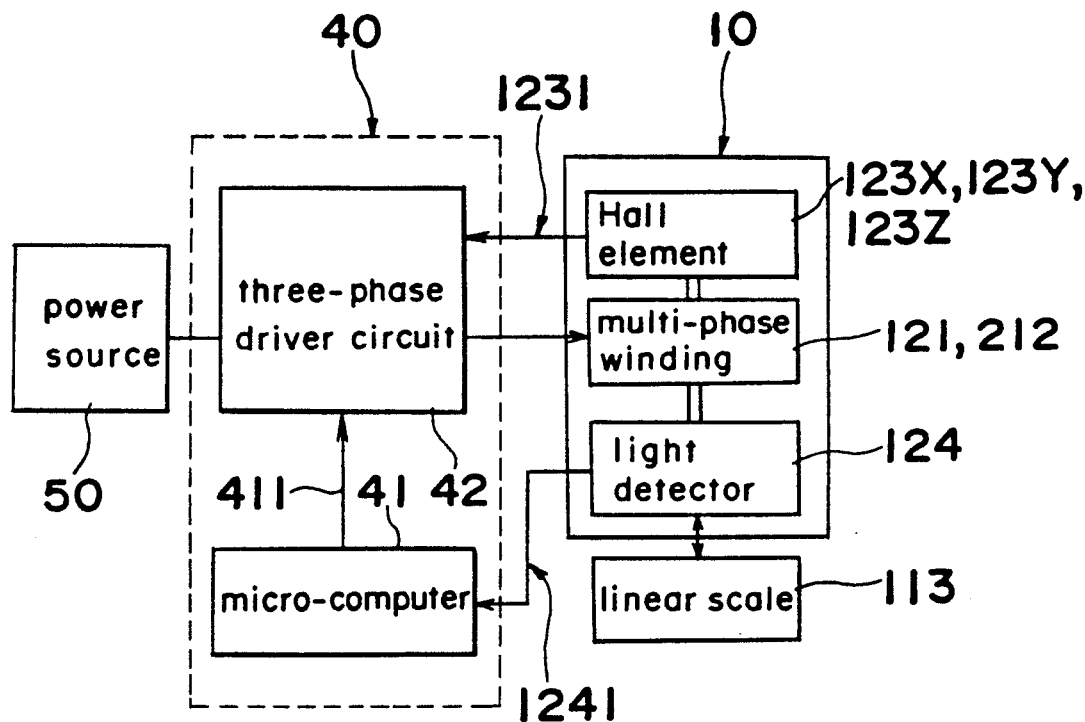

The electric construction of the linear driving apparatus will be described hereinafter with reference to FIG. 6.

The linear motor control portion 40 is a control circuit mainly including a microcomputer 41 named a so-called software survo. Three-phase excitation currents to be fed into the polyphase windings 121 and 221 are generated in accordance with the positional information or the like of the rotors 12 and 22 obtained by the positional detection signals 1241 of the photo detector 124 so as to control the impellent force to be generated in the linear motors 10 and 20. In further detail, the microcomputer 41 successively compares the positional data of the rotors 12 and 22 for the positional detecting signals 1241 from the predetermined and inputted instruction values for developing the PWM signals 411 in accordance with the compared results so that the PWM signals 411 are adapted to be outputted into the three-phase driver circuit 42 as the speed orders of the rotors 12 and 22. Furthermore, in addition to the PWM signals 411, the magnetic-pole detection signals 1231 from the hall elements 123X, 123Y and 123Z are introduced into the three-phase driver circuit 42. The magnetic-pole detection signals 1231 give the polarity information of the magnetic flux transmitted from the interlinking stator 11 into the air-core coils 121X, 121Y and 121Z of the rotor 12. The oscillation is effected in accordance with the speed instruction information through the PWM signals 411 and the polarity information through the magnetic-pole detection signals 1231 in the three-phase driver circuit 42. Thereby the driving currents corresponding to the duty ratio of the switching signals obtained ar adapted to be fed respectively into the polyphase windings 121 and 221.

The connection system of the polyphase windings 121 and 212 in the rotor 12 and the stator 22 will be described hereinafter with reference to FIG. 7.

The air-core coils 121X, 121Y and 121Z in the polyphase windings 121 are Y-connected as shown. The air-core coils 221X, 221Y and 221Z in the polyphase windings 212 are respectively connected in series for each phase.

Accordingly, in the linear driving apparatus of the present embodiment, the inner construction of the linear motor control portion 40 is simplified, and also, the hall element 123, the photo detector 124, etc. may be omitted by one unit only. The polyphase windings 121 and 212 for the rotor 12 connected in series for each phase. The respective phase currents flowing respectively into the polyphase windings 121, 212 become the same if the other conditions are the same, and the impellent force to be caused respectively as the motor 10, 20 become the same. Therefore, yawing is not caused in the rotor 12, because the rotor 22 is coupled by the coupling member 30 so as to ensure a smooth driving operation of the moving object.

The linear driving apparatus in the present invention is not restricted to the above-described embodiment. For example, when the polyphase windings are connected in the first linear motor, the respective phases of the polyphase windings in a second liner motor for the respective phases of the polyphase windings may be provided in shape so as to be connected in parallel, with the same effect being provided even in this case. Also, it is needless to say that the polyphase windings may be ones except for the three phase windings.

The connection system of the polyphase windings in the rotors 12 and 22 in FIG. 8 will be described as a modified embodiment of FIG. 7.

In the polyphase windings 121 and 221 in the rotors 12 and 22, the air-core coil and the air-core coil 221X of the same phase are connected in series. Also, the air-core coil 121Y and the air-core coil 221Y are connected in series, and the air-core coil 121Z and the air-core coil 221Z are similarly connected in series, with the connection system to being connected as a whole. However, when the connection system is changed into the connection from the Y-connection, the currents flowing into the polyphase windings 121 and 221 become larger as described hereinafter, so that it is required to make a wire, such as the air-core coil 121, larger in diameter for safety measures.

The principle for increasing the impellent force caused in the linear motors 10 and 20 by a linear driving apparatus of such a construction as described hereinabove will be described as compared with the conventional apparatus.

Suppose a three-phase power voltage to fed from the linear motor control portion 40 is the same in magnitude in the conventional embodiment, and also the present embodiment, with the phase voltage thereof being V.

Figure 7:
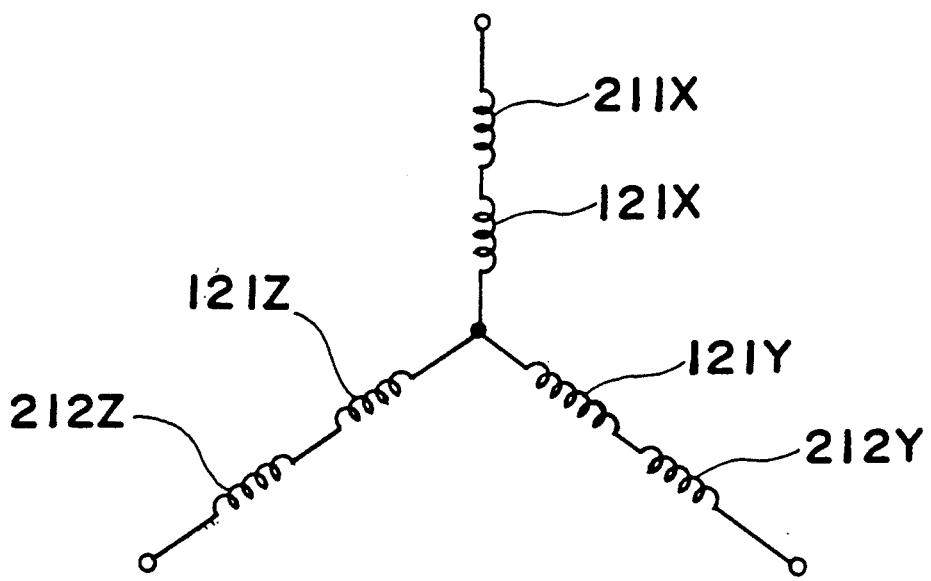
Figure 8:
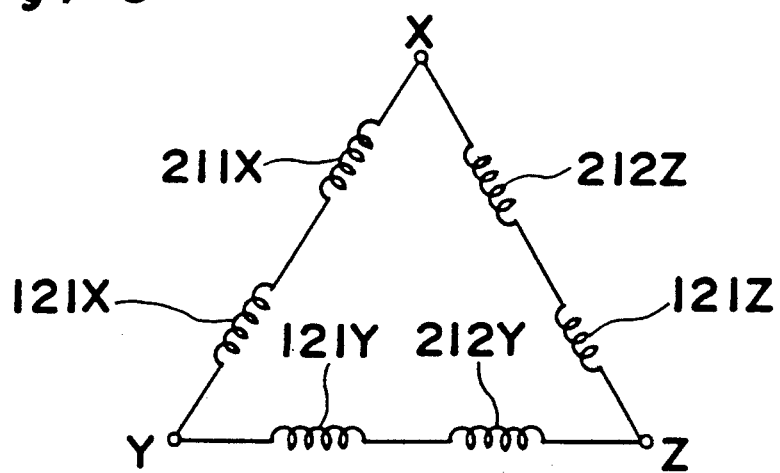
FIG. 8 is a connection view of polyphase windings illustrating a modified embodiment of FIG. 7.

When the polyphase windings 121 and 221 are of a Y-combined connection system as illustrated in FIG. 7, the currents flowing into the polyphase windings 121 and 221 from the X phase to the Y phase are assumed I1 (I11). When the polyphase windings are of a -combined connection system in an embodiment as illustrated in FIG. 7, the currents flowing from the X phase to the Y phase are assumed to be I2 (I22). In the above-described case, the following relation formula is provided, because the resistance values r of the respective air-core coils 121 are all the same.

$$(I1/I2) = 2 \qquad (1)$$

This formula is a relation between the current I1 and the current I2 without regard of counter electromotive forces v caused in the respective air-core coils 121 during the operation. The relation formulas between the current I1 and I2, considering the counter electromotive forces v, are as follows.

$$I11 = I1 - (v/r)$$

$$I22 = I2 - (v/r)$$

$$(I11/I22) = 2 = v(I2 \cdot r - v)$$

$$> 2 \qquad (2)$$

Accordingly, in the case of the present embodiment, as the currents flowing into the polyphase windings 121 and 221 become doubled or greater, an impellent force increase of two times or more may be effected in principle. When the impellent force to be caused in the linear motors 10 and 20 are equal, it is possible to effect the smooth driving operation of the rotors 12 and 22 without the production of the yawing. As the above-described advantages are provided only through the change in the connection system, the linear driving apparatus of a higher positioning accuracy and a lower price may be manufactured and developed.

Figure 9:
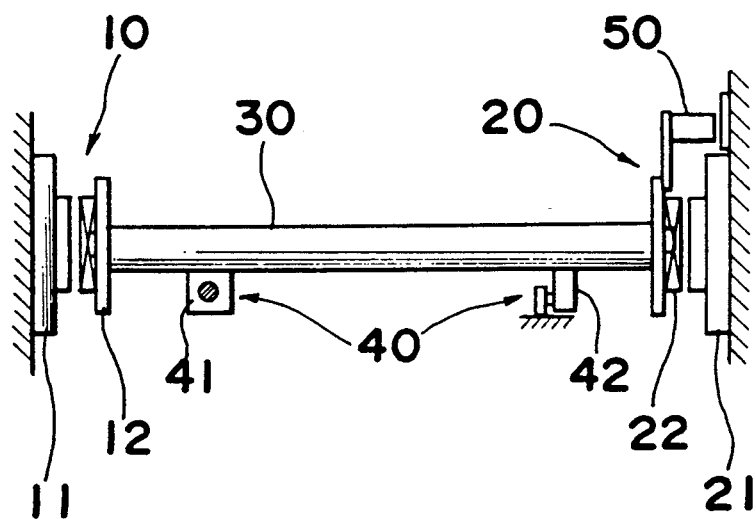
FIG. 9 and FIG. 10 are views each for illustrating the second embodiment of the linear driving apparatus in accordance with the present invention, with FIG. 9 being a side view of the linear driving apparatus, and FIG. 10 being a view equivalent to the view of FIG. 9 illustrating the modified embodiment of the guide member.
Figure 10:
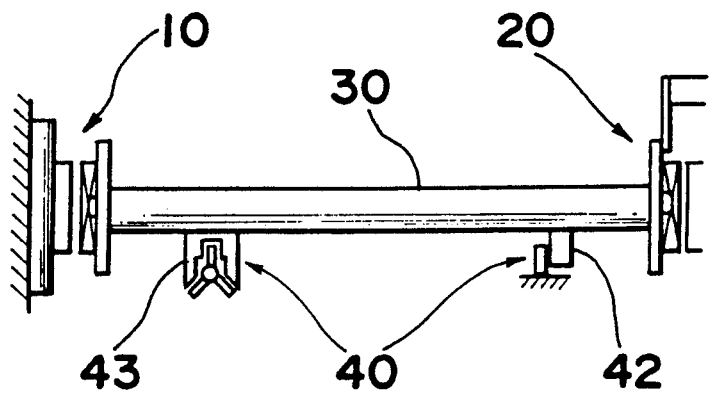
Figure 11:
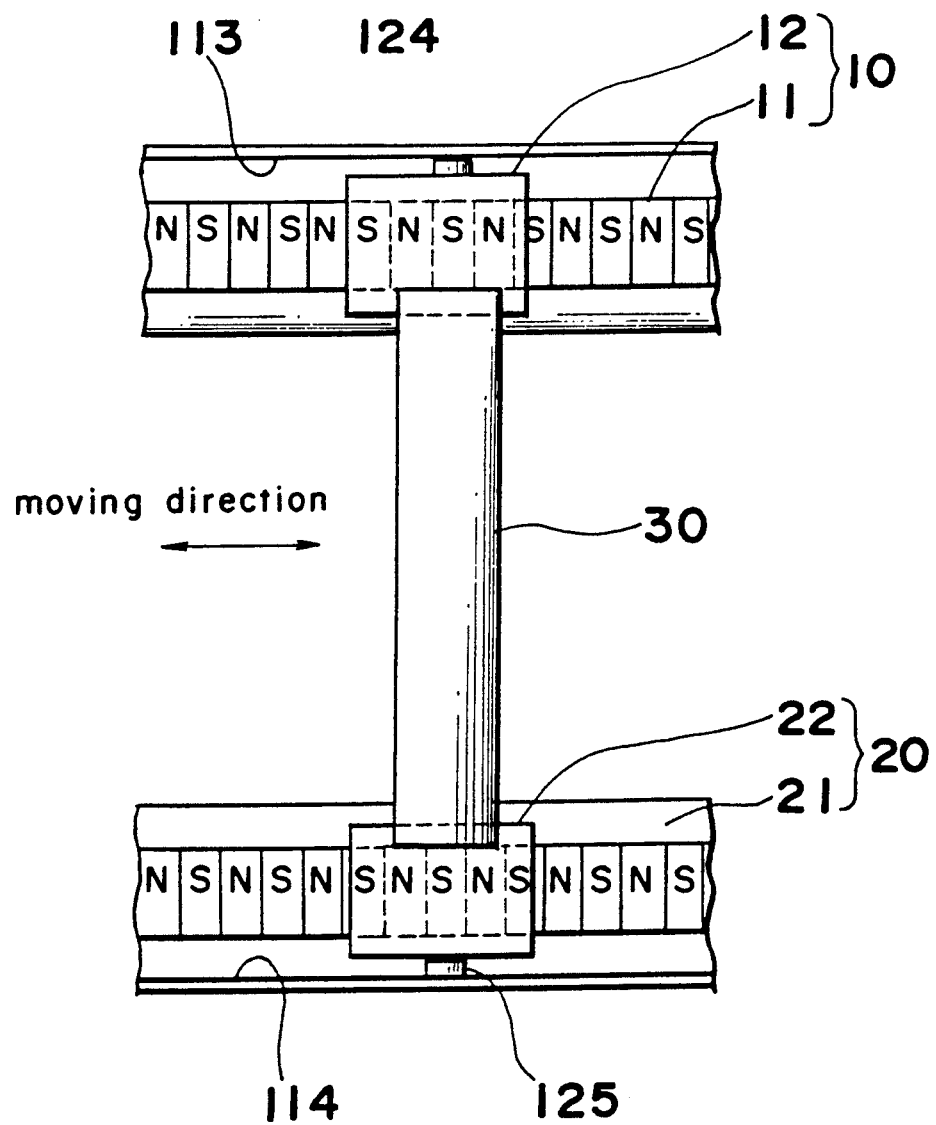
FIG. 11 an FIG. 12 are views for illustrating a linear driving apparatus of previous design, with FIG. 11 being a plan view equivalent to plan view of FIG. 2, and FIG. 12 being an electric block diagram equivalent to the diagram of FIG. 6.
Figure 12:
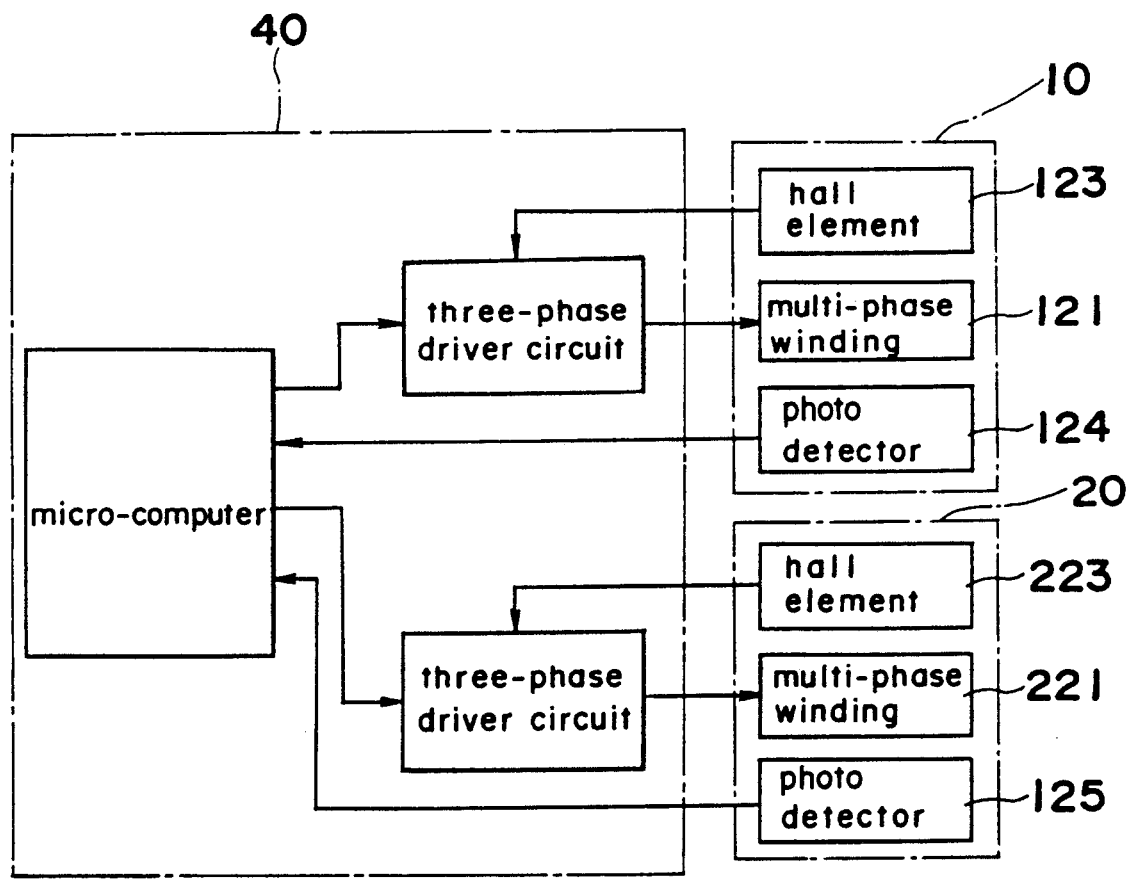

In the second embodiment illustrated in FIG. 9 and FIG. 10 as a modified embodiment of FIG. 1, the linear driving apparatus is equipped on a duplicating apparatus of an electronic photograph system and moves alternately in the document scanning direction of an optical mechanism (not shown) including a reflection mirror and a light source (lamp) by the linear motors 10 and 20 (equivalent to the first and second linear motors). The optical mechanism is secured onto the top portion of the coupling member 30 which couples the rotors 12 and 22 in the linear motors 10 and 20 to each other, with a guide member 40 for axially supporting the rotors 12, 22 being provided under the coupling member 30. Also, the rotors 12 and 22 in the linear motors 10, 20 are respectively disposed sideways on both the end faces of the coupling member 30. The stators 11 and 21 in the linear motors 10 and 20 stand vertically with a given gap with respect to the rotors 12 and 22. It is to be noted that an encoder 50 for detecting the moving position of the local mechanism is provided above the rotor 22.

Namely, the gap between the stators 11 and 21 in the linear motors 10 and 20 and the gap between the rotors 12 and 22 are to be regulated in space by the guide members 40. The guide member 40 includes a slide bearing portion 41 and a rolling bearing portion 42 respectively disposed on both the under sides of the coupling member 30 (see FIG. 9), so that the sliding load does not become too big, and magnetic suction force to be described later is adapted to be absorbed. FIG. 10 illustrates a modified embodiment of the guide member 40. Namely, such a slide bearing portion 43 for combining the slide bearing portion with the rolling bearing is provided on the left side of the drawing in the lower portion of the coupling member 40. The slide bearing portion 43 is constructed in three portions that the wheel which may come into contact against the pipe on the side of the coupling member.

In the construction of the linear motor 20, the driving force required to move the optical mechanism is to be produced by the linear motors 10 and 20, and a magnetic suction force between two and three times the driving force exists between the stators 11 and 21 and the rotors 12 and 22. In the linear driving apparatus in the present embodiment, the magnetic suction force is adapted so that a direct action is not produced upon the guide member 40. The principle therefor will be described hereinafter.

Although the magnetic suction force to be generated in the linear motor 10 and the magnetic suction force generated in the linear motor 20 are not always equal, the direction thereof is opposite to each other in the arrangement construction of the linear motors 10 and 20 so as to negate the mutual forces. Accordingly, only the difference between the magnetic suction forces caused in the linear motors 10 and 20 has the action upon the guide member 40. Therefore, the construction of the guide member 40 may be made much simpler and the friction force to be caused by the guide member 40 may be reduced considerably. Also, the substantial driving forces of the linear motors 10 and 20 may be increased by the reduction portion of the friction forces. Furthermore, the optical mechanism may be smoothly moved, without a possibility of binding the slide bearing 41. Thus, the reliability of the guide member 40 may be considerably improved. The above-described merit may be enjoyed even when the driving forces of the linear motors 10 and 20 are set higher so that the higher speed may be effected without reducing the performance of the duplicating apparatus. Also, the horizontal width of the linear driving apparatus may be made shorter in the arrangement for the construction of the linear motors 10 and 20, so that the duplicating apparatus may be designed more compact.

It is to be noted that the linear driving apparatus of the present invention is not restricted to the application of the duplicating apparatus only.

When the linear driving apparatus of the present invention is used, the first and second linear motors which are coupled in shape by the coupling member are not controlled independently, but the impellent force the motors caused in them are adapted to be constructed the same. Therefore, the construction of the apparatus is considerably simplified and the cost thereof may be reduced so that the positioning control and the speed control may be effected at a higher accuracy.

When the linear driving apparatus of the present invention is used, the currents flowing into the apparatus are adapted to be drawn by a large amount only through the ring connection of the polyphase windings in the connecting system. Therefore, the impellent force caused in the linear motor may be increased considerably without any increase in the line voltage of the power supply for feeding the power to the linear motor. Furthermore, as the impellent force to be caused in the first and second liner motors becomes equal in the connection system, the smooth driving operation may be realized without the generation of the yawing. Therefore, the linear driving apparatus may be developed for of a lower cost and a higher performance.

Furthermore, when the linear driving apparatus of the present invention is used, the magnetic suction forces to be caused respectively in the first and second linear motors are adapted to be mutually negated, so that the magnetic suction forces caused in the first and second linear motors do not have direct action upon the guide member. Thus, the frictional forces in the guide members may be made considerably small and the substantial driving forces in the first and second linear motors may be set higher. Also, the reduction of the frictional forescore very significant in the promoting a higher speed without reducing the performance of the apparatus, because the rigid guide member is not required to be used, and the guide member becomes higher in reliability.

Although the present invention has been fully described by way of example with reference to the accompanying drawings, it is to be noted here that various changes and modifications will be apparent to those skilled in the art. Therefore, unless otherwise specified, such changes and modifications depart from the scope of the present invention, they should be construed as included therein.

What is claimed is:

1. A linear driving apparatus comprising:
   first and second linear motors, each of which includes,
     a stator having a plurality of permanent magnets, and
     a movable member having polyphase windings and being freely movable through a gap on a top face of said stator;
   a coupling member for mutually coupling said movable members of said first and second linear motors and being driven by said movable members through a polyphase excitation of said polyphase windings of said first and second linear motors; and
   connecting means for connecting electrically the polyphase windings having a first phase of said movable member of said first linear motor with the polyphase windings having said first phase of said movable member of said second linear motor in series or in parallel, and the polyphase windings having said second phase of said movable member of said first linear motor with the polyphase windings having said second phase of said movable member of said second linear motor in series or in parallel.

2. A linear driving apparatus comprising:
   first and second linear motors, each of which includes,
     a stator having a plurality of permanent magnets, and
     a movable member having polyphase winding coils and being freely movable through a gap on a top face of said stator;
   a coupling member for mutually coupling said movable members of said first and second linear motors and being driven by said movable members through a polyphase excitation of said polyphase winding coils of said first and second linear motors;
   first connecting means for connecting electrically the polyphase winding coils having a first phase of said movable member of said first linear motor with the polyphase winding coils having said first phase of said movable member of said second linear motor in series or in parallel, the polyphase winding coils having a second phase of said movable member of said first linear motor with the polyphase winding coils having said second phase of said movable member of said second linear motor in series or in parallel, and the polyphase winding coils having a third phase of said movable member of said first linear motor with the polyphase winding coils having said third phase of said movable member of said second linear motor in series or in parallel; and
   second connecting means for connecting said polyphase winding coils having said first phase, second phase and third phase of said movable members of said first and second linear motors are connected to form a ring as the whole.

3. A linear driving apparatus comprising:
   first and second linear motors, each of which includes,
     a stator having a plurality of permanent magnets and being disposed vertically in said first and second linear motors, and
     a movable member having polyphase windings and being freely movable through a gap on a top face of said stator;
   a coupling member for mutually coupling said movable members of said first and second linear motors and being driven by said movable members through a polyphase excitation of said polyphase windings of said first and second linear motors, said movable members being respectively disposed on both end portions in the longitudinal direction of said coupling member; and a guide member for axially supporting said coupling member or said movable member, so that said movable members are driven through said polyphase excitation of said polyphase windings of said first and second linear motors.

4. The linear driving apparatus according to claim 1, wherein said polyphase windings comprise a plurality of air-core coils.

5. The linear driving apparatus according to claim 1, further comprising a photo detector disposed on said movable member.

6. The linear driving apparatus according to claim 2, wherein said polyphase winding coils comprise a plurality of air-core coils.

7. The linear driving apparatus according to claim 2, further comprising a photo detector disposed on said movable member.

8. The linear driving apparatus according to claim 3, wherein said polyphase windings comprise a plurality of air-core coils.

9. The linear driving apparatus according to claim 3, further comprising a photo detector disposed on said movable member.

* * * * *

UNITED STATES PATENT AND TRADEMARK OFFICE
CERTIFICATE OF CORRECTION

PATENT NO. : 5,066,897
DATED : November 19, 1991
INVENTOR(S) : Tetuyuki Ueda, et. al.

It is certified that error appears in the above-indentified patent and that said Letters Patent is hereby corrected as shown below:

On the Title page, item [63] line, 9, change "7,356,173" to -- 07/356,173--.

Signed and Sealed this

Nineteenth Day of October, 1993

Attest:

BRUCE LEHMAN

*Attesting Officer*    *Commissioner of Patents and Trademarks*